United States Patent
Bakx

[11] Patent Number: 5,155,717
[45] Date of Patent: Oct. 13, 1992

[54] MULTIPLE BEAM OPTICAL SCANNING DEVICE WHEREIN SCANNING CONTROL SIGNALS ARE STABILIZED AGAINST VARIATIONS IN BEAM INTENSITIES

[75] Inventor: Johannes L. Bakx, Eindhoven, Netherlands

[73] Assignee: U.S. Philips Corporation, New York, N.Y.

[21] Appl. No.: 758,979

[22] Filed: Sep. 9, 1991

[30] Foreign Application Priority Data

May 10, 1991 [EP] European Pat. Off. ........ 91201132.7
Jul. 31, 1991 [EP] European Pat. Off. ........ 91201986.6

[51] Int. Cl.$^5$ ............................................. G11B 7/00
[52] U.S. Cl. ............................. 369/44.37; 369/44.38; 369/44.41
[58] Field of Search ............. 369/44.37, 44.41, 44.42, 369/44.23, 44.11, 100, 109, 110, 111, 112, 44.38, 116, 44.39, 44.32, 44.25, 44.27

[56] References Cited

U.S. PATENT DOCUMENTS

| | | | |
|---|---|---|---|
| 4,446,545 | 5/1984 | Van Dijk | 369/44.37 |
| 4,533,826 | 8/1985 | van Alem | 369/44.42 |
| 4,797,870 | 1/1989 | Nakai et al. | 369/112 |
| 4,983,002 | 1/1991 | Shikama et al. | 369/44.11 |

FOREIGN PATENT DOCUMENTS

WO90/15408 12/1990 PCT Int'l Appl. .

*Primary Examiner*—Roy N. Envall, Jr.
*Assistant Examiner*—Hung Dang
*Attorney, Agent, or Firm*—Leroy Eason

[57] ABSTRACT

A scanning device including an optical head which generates three radiation beams for scanning a track in an information plane of a record carrier. The radiation from the record carrier produced by the respective beams is detected by respective detection systems. The resulting detection signals are combined to derive scanning control signals as well as a reference signal which corresponds to variations in and differences between the beam intensities. A divider circuit uses the reference signal to stabilize the control signals against such variations and differences in the beam intensities.

11 Claims, 4 Drawing Sheets

MULTIPLE BEAM OPTICAL SCANNING DEVICE WHEREIN SCANNING CONTROL SIGNALS ARE STABILIZED AGAINST VARIATIONS IN BEAM INTENSITIES

BACKGROUND OF THE INVENTION

1. Field of the Invention

The invention relates to a device for optically scanning a record carrier information plane having tracks, which device comprises an optical system for generating a first and a second tracking beam and a main beam, a lens system for focusing the three beams on the information plane to two tracking spots at both sides of the centreline of a track to be scanned and to one main spot on said track, at least three detection systems a, b and c for receiving radiation of the first and second tracking beams and the main beam from the information plane, and a signal processing circuit for deriving a reference signal $S_r$ from detector signals $S_i$, where detector signal $S_i$ is a measure of the total radiation energy incident on detection system i,

2. Description of the Related Art

A device of this type which can be used, inter alia, in apparatuses for writing and reading information in the tracks of optical record carriers is known from U.S. Pat. No. 4,446,545. In this device two tracking beams are focused to tracking spots at both sides of the track on which a main beam is focused to a main spot, and it comprises three detection systems in the form of single detectors a, b and c for detecting the intensity of each one of the tracking beams and the main beam after reflection on the information plane. The difference of the output signals $S_a$ and $S_b$ of the detectors a and b, respectively, is the tracking error signal which can be used as a control signal for the tracking servosystem with which the main beam is held on the track. To be independent of intensity variations of the radiation source, the tracking error signal is normalized by dividing it by a reference signal $S_r$. The known reference signal is generated in accordance with the formula $$S_r = S_a + S_b - \alpha S_c,$$

in which the constant $\alpha$ is larger than 0 and is chosen to be such that the reference signal has a cosine-shaped variation as a function of the distance between the main spot and the centreline of the track. Since the non-normalized tracking error signal has a sine-shaped variation, the normalized tracking error signal will thus have a tangent-shaped variation.

A drawback of the known reference signal is that the signal $S_r$ becomes periodically zero when the beams move transversally across the tracks, for example, during a searching action, so that problems with the desired division will arise if no further measures are taken. Moreover, the cosine-shaped variation of the reference signal can only be used for normalizing the tracking error signal. Other control signals such as a focus error signal cannot be normalized by means of the known reference signal.

SUMMARY OF THE INVENTION

The present invention has for its object to obviate these drawbacks and provides a scanning device in which the reference signal is generated in a different way and can be used under all circumstances.

To this end the scanning device according to the invention is characterized in that the signal processing circuit forms the reference signal $S_r$ in accordance with the formula $$S_r = S_a + S_b + zS_c,$$

so that the reference signal is free from modulation by the tracks, in which z is a constant equal to $-2T \cos(\phi)$, with $\phi = 2\pi x_0/q$ and $x_0$ is the transversal distance between a tracking spot and the main spot, q is the track pitch and T is the intensity ratio between a tracking beam and the main beam, while z is zero for $\phi = \pi/2$. It is achieved by the given combination of detector signals that the reference signal is only dependent on intensity variations of the radiation source and is not dependent on the transversal position of the spots on the track structure.

A first embodiment of the device according to the invention is characterized in that $x_0 = \frac{1}{4}q$ and in that the circuit forms the sum of $S_a$ and $S_b$.

A second embodiment of the device according to the invention is characterized in that $x_0 = \frac{1}{2}q$ and in that the circuit forms the sum of $S_a$, $S_b$ and $2T^*S_c$.

A special embodiment of the device according to the invention is characterized in that the signal processing circuit comprises a circuit for multiplying one of the signals $S_a$, $S_b$ by a further constant, said further constant being dependent on the ratio of the tracking beam intensities. This circuit compensates for an inequality of the intensity of the two tracking beams.

The reference signal is suitable for normalizing all control signals which can be derived from the detector signals. The normalization can be carried out in a special embodiment of the device according to the invention, comprising a normalizing circuit for normalizing a control signal derived from signals of the detection systems and used for positioning the main spot, and characterized in that an input of the normalizing circuit is coupled to the output of the signal processing circuit delivering the reference signal $S_r$.

In further embodiments the reference signal is used for normalizing a tracking error signal, a focus error signal, a track loss signal and a position signal.

The reference signal can also be used for detecting reflectance errors of the information plane. A special embodiment of the device according to the invention having this possibility is characterized in that the device comprises a flaw discriminator for detecting deviations in the reflectance of the information plane, and in that an input of the flaw discriminator is connected to the output of the signal processing circuit delivering the reference signal $S_r$.

A further embodiment is characterized in that the flaw discriminator comprises a sub-circuit with an input to receive a signal representing the radiation energy in the three beams in order to make the flaw discriminator independent of said radiation energy. So, it will operate correctly both during reading and writing, when the power in the beams varies strongly.

BRIEF DESCRIPTION OF THE DRAWINGS

The invention will now be described in greater detail by way of example with reference to the accompanying drawings in which.

Identical reference numerals in the various Figures refer to the same components.

DESCRIPTION OF THE PREFERRED EMBODIMENTS

Figure 1:
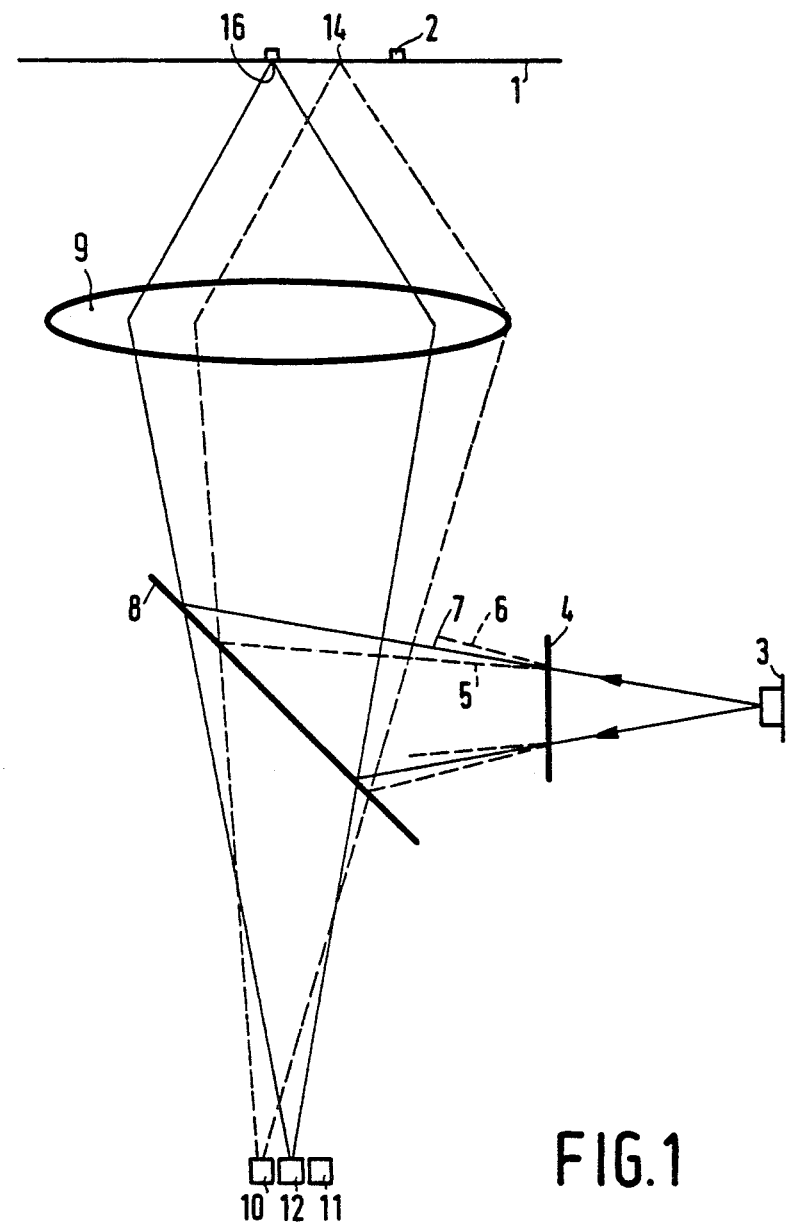
FIG. 1 shows a scanning head scanning an information plane by means of three beams.
Figure 2:
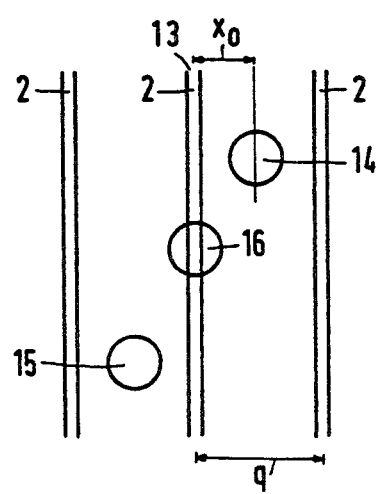
FIG. 2 shows the position of the spots formed by the three beams on the information plane.

The invention will be described by way of example with reference to a device having an optical scanning head in which a tracking error is generated by means of the two-beam method. FIG. 1 shows an information plane 1 which is scanned by means of such an optical head. The information plane has parallel tracks 2 which are perpendicular to the plane of the drawing. The information can be stored as optically readable areas (not shown in the Figure) between or in the tracks 2. The optical head comprises a radiation source 3, for example, a diode laser, whose radiation is incident on a grating 4. The grating splits the incoming beam into a +1, −1 and 0-order beam, i.e. a first tracking beam 5, a second tracking beam 6 and a main beam 7. For the sake of clarity only the full paths of the first tracking beam and of the main beam are shown. A beam splitter 8, for example a partially transparent mirror sends the beams towards an objective lens 9 which focuses the beams on the information plane 1. The positions of the spots formed on the information plane are shown in FIG. 2 for the case where there are no tracking errors. The track pitch or track period is q. Track 13 is the track which the scanning head must follow at the moment. The first and second tracking beams form tracking spot 14 and tracking spot 15, respectively. Main spot 16 formed by the main beam 7 is located on track 13. The two centres of the tracking spots have a transversal distance $x_0$, i.e. measured perpendicularly to the tracks, from the centre of the main spot 16. If there is no tracking error, as in FIG. 2, the distance between a tracking spot and the centreline of the track 13 is also equal to $x_0$. As is shown in FIG. 1, the radiation reflected by the information plane is passed towards three detection systems 10, 11, 12 via the objective lens 9 and the beam splitter 8. Detection system 10 receives radiation from the first tracking beam 5, detection system 11 receives radiation from the second tracking beam 6 and detection system 12 receives radiation from the main beam 7.

Figure 3:
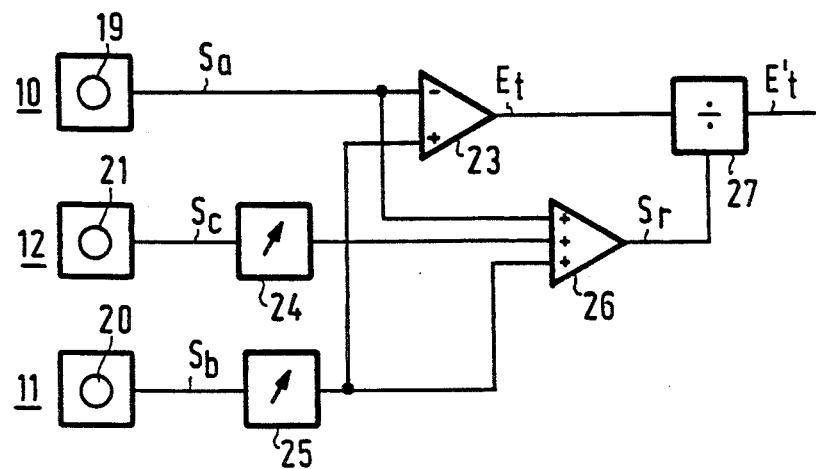
FIG. 3 shows the three detection systems of the scanning head with a circuit for generating a normalized tracking error signal.

FIG. 3 shows the three detection systems in a plan view. In the embodiment shown each detection system is a single detector. The spots formed by the tracking beams 5 and 6 and the main beam 7 on the detection systems are denoted by the reference numerals 19, 20 and 21, respectively, in FIG. 3. The signals $S_a$, $S_b$ and $S_c$ are a measure of the total quantity of radiation incident on the detection systems 10, 11 and 12, respectively. As is known from, for example, Principles of optical disc systems, G. Bouwhuis et al (Hilger, 1985), page 71, the signals can be defined as follows:

$$S_a = kI_a[d + n \cos(2\pi x/q + \phi)] \quad (1)$$

$$S_b = kI_b[d + n \cos(2\pi x/q - \phi)] \quad (2)$$

$$S_c = kI_c[d + n \cos(2\pi x/q)] \quad (3)$$

with $$\phi = 2\pi x_0/q. \quad (4)$$

Here k is a detector-dependent constant which is determined by the efficiency of the conversion of optical intensity into electric signal, $I_i$ is the intensity in beam i at the location of the associated detection system i, d is a constant, n is the modulation amplitude in the case of a transversal displacement of the scanning head across the tracks and dependent on the geometry of the tracks, and x is a tracking error, i.e. the transversal deviation of the centre of the spot 16 with respect to the centreline of the track 13. The intensity $I_i$ is principally determined by the intensity of the radiation from the laser 3, the efficiency of the grating 4 and the reflection of the information plane 1. $I_a$ and $I_b$ will be approximately equal.

As is known from U.S. Pat. No. 3,876,842, the difference between the signals $S_a$ and $S_b$ is a measure of the tracking error x. A differential amplifier 23 in FIG. 3 forms the difference signal $E_t$, i.e. the tracking error signal from the input signals $S_a$ and $S_b$. For the case where $I_b = I_a$, it can be derived from formulas (1) and (2) that $$E_t = S_b - S_a$$

$$= 2knI_a \sin\phi \sin(2\pi x/q).$$

For small tracking errors x the tracking error signal $E_t$ is proportional to x. $E_t$ can therefore be used as a control signal for a tracking servosystem with which the main spot 16 can be held on the track 13. An optimum tracking error signal is obtained if $\phi = \pi/2$, i.e. in the nominal state the tracking spots are located at a distance of a quarter of the track pitch from the centreline of the track to be followed. $E_t$ then has a maximum sensitivity for x around x = 0.

The value of the tracking error signal $E_t$ in formula (5) is dependent on the intensity $I_a$ incident on the detection system 10. This intensity depends, inter alia, on the quantity of radiation supplied by the laser 3 and on the reflection coefficient of the information plane 1. For example, if the laser supplies ten times more power during writing than during reading of information in the information plane, a given tracking error x will result in a tracking error signal $E_t$ which is ten times stronger during writing than during reading. In the same way the tracking error signal is influenced by a variation of the reflection of the information plane 1. This is an unwanted situation for a control loop. For this reason the tracking error signal must be made independent of the beam radiation intensity on the detection systems. According to the invention a reference signal $S_r$ is therefore derived as the following combination of detector signals $S_i$:

$$S_r = S_a + S_b + zS_c \quad (6)$$

in which the constant z is equal to $-2T \cos \phi$, with $$T = I_a/I_c, \quad (7)$$

so that $$S_r = S_a + S_b - 2T \cos \phi S_c. \quad (8)$$

Filling in the values for $S_a$, $S_b$ and $S_c$ in accordance with formulas (1), (2) and (3) yields:

$$S_r = 2kdI_a(1 - \cos \phi). \quad (9)$$

It is apparent therefrom that $S_r$ is no longer dependent on the variable x, hence on the transversal position of the spots. The signal $S_r$ is free from modulation by the tracks 2 in the information plane, i.e. when displacing the scanning head transversely across the tracks, the signal $S_r$ does not vary due to the tracks. $S_r$ is now a measure of the quantity of radiation incident on the detection systems and is suitable for normalizing control signals which also depend on this quantity of radiation. If the tracking spots 14 and 15 are nominally located at a quarter of the track pitch from the centreline of the track to be followed, i.e. if they have a mutual transversal distance of half a track pitch, so that $\phi = \pi/2$, the reference signal is $$S_r = S_a + S_b \quad (10)$$

If the tracking spots 14 and 15 are nominally located at half a track pitch from the centreline of the track to be followed, i.e. if they have a mutual transversal distance of a full track pitch, so that $\phi = \pi$, the reference signal is $$S_r = S_a + S_b + 2TS_c. \quad (11)$$

Using formulas (5) and (8), the normalized tracking error signal $E_t'$ now is $$E_t' = (E_t/S_r)V_{ref}$$

$$= n \sin (2\pi x/q) V_{ref}/(d \tan (\phi/2)), \quad (12)$$

in which $V_{ref}$ is an arbitrary reference voltage. The multiplication by $V_{ref}$ is necessary to give $E_t'$ the dimension of an electric signal, because the quotient $E_t/S_r$ is dimensionless. The normalized tracking error signal is now independent of the intensity of the laser 3 and the reflection coefficient of the information plane 1.

The intensity in the two tracking beams 5 and 6 may possibly be different. This may occur when, for example, the tracking beams are generated from the border rays of the beam from the laser 3, as described in Netherlands Patent Application no. 9002007 (PHN 13.445). If the intensity distribution in the beam is asymmetrical, the border rays will not be equally intensive and the tracking beams 5 and 6 will thus have a different intensity. Consequently, a phase term will be added to the term $2\pi x/q$ in formula (5) for the tracking error signal $E_t$. The result is that $E_t$ is no longer zero when the main spot 16 is exactly on the track 13 and the tracking servosystem will put the main spot off the track. A satisfactory tracking error signal can be obtained in this case by multiplying the signal $S_b$ by a correction factor b, in which b is equal to the ratio between the intensity in spots 19 and 20 on the detection systems 10 and 11, respectively. Formula (5) for forming the tracking error signal is then defined as follows:

$$E_t = b S_b - S_a$$

$$= 2kn I_a \sin \phi \sin (2\pi x/q) \quad (13)$$

with $$b = I_a/I_b. \quad (14)$$

The reference signal $S_r$ is also dependent on $I_a/I_b$. The correction of $S_r$ is analogous to the correction of $E_t$, viz. the term $S_b$ in formulas (6), (8), (10) and (11) is multiplied by the constant b. This is the same constant as the one given in formula (14) for the correction of $E_t$. Instead of multiplying $S_b$ by b, $S_a$ can of course also be multiplied by $1/b$.

An embodiment of the signal processing circuit forming the reference signal $S_r$ is shown in FIG. 3. The output $S_c$ of the detection system 12 is multiplied by means of a circuit 24 by the constant factor $-2T \cos \phi$, in which $\phi$ depends on the predetermined transversal distance $x_0$ between the tracking spots 14, 15 and the main spot 16. If desired, T can be made adjustable so that a measured value of the intensity ratio of spots 19 and 21 can be introduced into the signal processing circuit. If the intensity in the spots 19 and 20 of the tracking beams 5 and 6 is not equal, the signal $S_b$ should be multiplied by the constant b in a circuit 25 (see formula (14)). If desired, b can be made adjustable so that a measured value of the intensity ratio of spots 19 and 20 can be introduced. The signal $S_a$ and the outputs of the circuits 24 and 25 are added in a summing amplifier 26. The output signal of the summing amplifier is the reference signal $S_r$. A normalizing circuit 27 divides the tracking signal $E_t$ by the reference signal $S_r$ and multiplies the result by the reference voltage $V_{ref}$. Normalization can be simply implemented in an integrated circuit, for example, in the form of the known Gilbert cell. The output signal of the normalizing circuit is the normalized tracking error signal $E_t'$ which can be used for a tracking servosystem.

Figure 4:
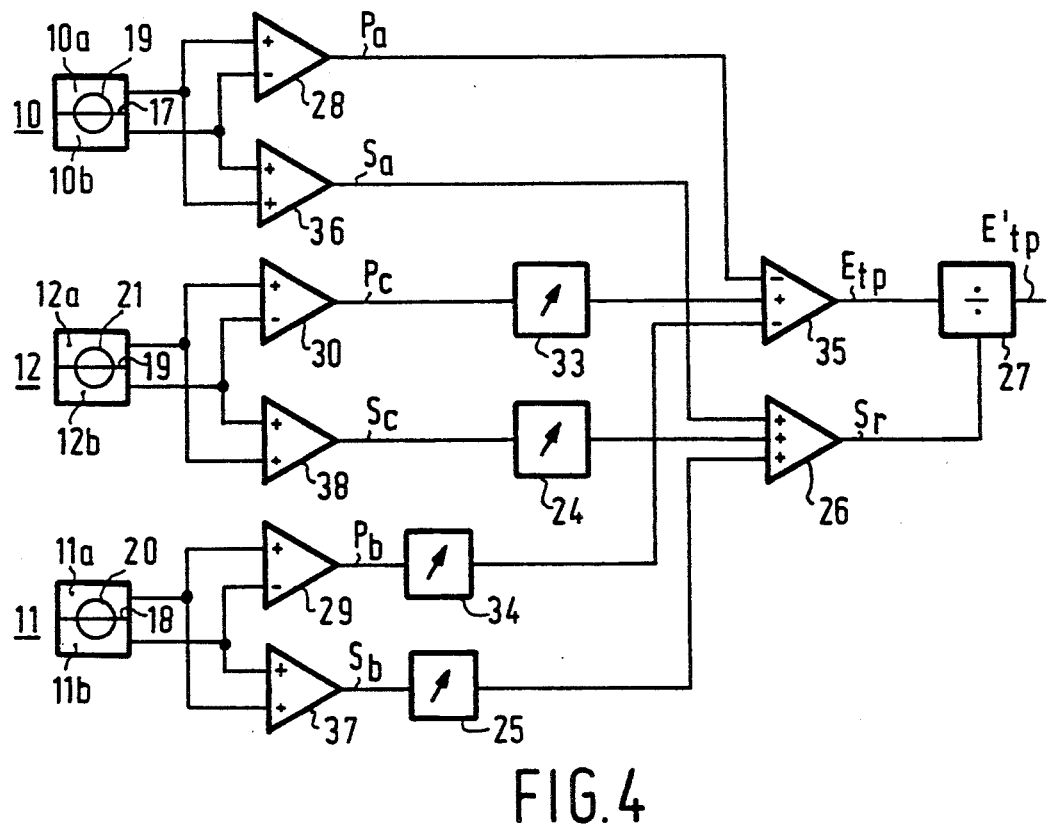
FIG. 4 shows an alternative circuit for generating a normalized tracking error signal.

The tracking error signal can also be generated in accordance with the three-beam push-pull method which is described in European Patent Application no. 0,201,603. In this method use is made of detection systems 10, 11 and 12 which are divided into two halves each by separating lines 17, 18 and 19, respectively, each half forming a detector. These detectors are denoted by the reference numerals 10a, 10b and 11a, 11b and 12a, 12b in FIG. 4. The separating lines extend parallel to the tracks 2 in the information plane 1. The spots formed by the three beams on the detectors are denoted by the reference numerals 19, 20 and 21 in FIG. 4. The three beams are detected in accordance with the push-pull principle. To this end, a differential amplifier 28 is added to the detection system 10, which amplifier forms a push-pull signal Pa which is the difference between the signals of the detector halves 10a and 10b. Similarly, differential amplifiers 29 and 30 form the push-pull signals Pb and Pc of detection systems 11 and 12, respectively. The operation $$E_{tp} = 2T Pc - (Pa + b Pb) \quad (15)$$

leads to signal $E_{tp}$ representing the tracking error x. A circuit 33 multiplies the signal Pc by the constant factor 2T (see formula (7)). If the intensity in the spots 19 and 20 of the tracking beams 5 and 6 is not equal, the signal Pb must be multiplied by the constant b in a circuit 34 (see formula (14)). The output signals of the differential amplifier 28 and the circuit 34 are subtracted in an amplifier 35 from the output signal of the circuit 33. The output signal of the amplifier 35 is the tracking error signal $E_{tp}$. Similarly as the value of $E_t$ in formula (6), the value of $E_{tp}$ is dependent on the intensity $I_a$ incident on the detection system 10. The control signal $E_{tp}$ can now be normalized in the same way as $E_t$. To this end, the sum signals $S_a$, $S_b$ and $S_c$ are formed from the signals of the detection systems 10, 11 and 12 by summing amplifiers 36, 37 and 38, respectively. The circuit 24 multiplies $S_c$ by the constant factor $-2T \cos \phi$, while the circuit 25 multiplies the signal $S_b$ by the constant b if the intensities of the spots 19 and 20 are not equal. The summing amplifier 26 adds the signals from the summing amplifier 36 and the circuits 24 and 25 to the desired reference signal $S_r$. The normalizing circuit 27 divides the tracking error signal $E_{tp}$ by the reference signal $S_r$ and multiplies the result by a reference voltage. The output signal of the normalizing circuit is the normalized tracking error signal $E_{tp}'$ which can be used for a tracking servosystem.

Figure 5:
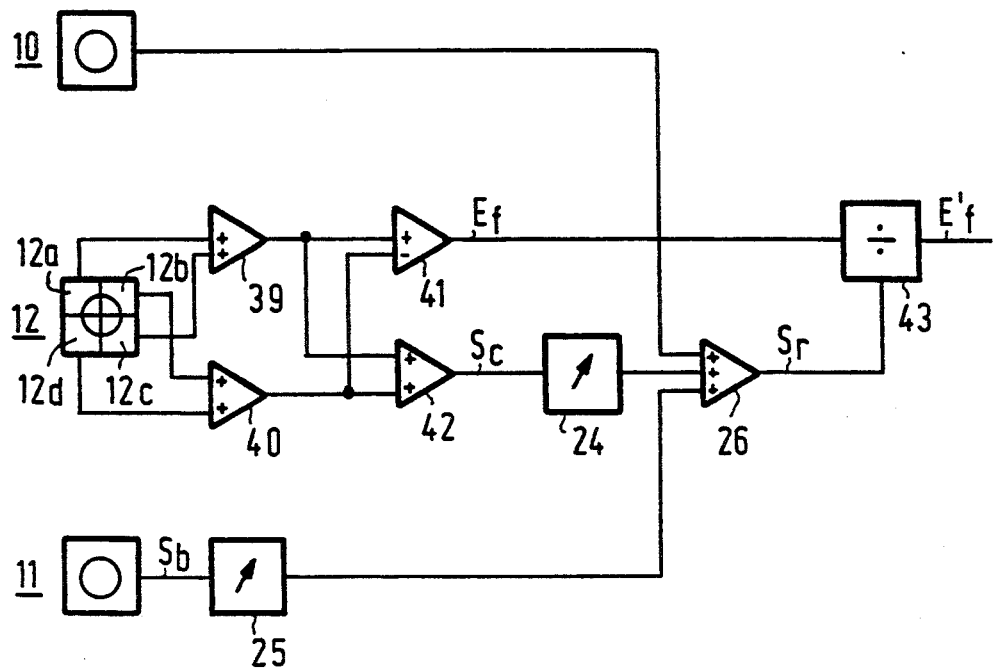
FIG. 5 shows a circuit for generating a normalized focus error signal.

The reference signal $S_r$ can be used for normalizing all control signals which can be derived from the detection systems 10, 11 and 12. Another example of a control signal to be normalized is the focus error signal. FIG. 5 shows a circuit with which a focus error signal can be derived in accordance with the astigmatic method known from U.S. Pat. No. 4,023,033. To this end, the detection system 12 is divided into four quadrants 12a, 12b, 12c and 12d. Two summing amplifiers 39 and 40 add the detector signals of the quadrants 12a, 12c and 12b, 12d, respectively. A differential amplifier 41 forms the focus error signal $E_f$ from the output signals of the two summing amplifiers. The reference signal can be formed in the same way as in FIG. 3, or, in the case of split detection systems 10, 11 and 12, as in FIG. 4. FIG. 5 shows an alternative in which a signal $S_c$ is formed by a summing amplifier 42 which adds the output signals of the summing amplifiers 39 and 40. The normalizing circuit 43 divides the focus error signal $E_f$ by the reference signal $S_r$ and multiplies the result by a reference voltage. The output signal of the normalizing circuit is the normalized tracking signal $E_f'$ which can be used for a focus servosystem.

A focus error signal obtained by the Foucault or knife-edge method, which is known per se from U.S. Pat. No. 4,533,826, can also be normalized by means of the described signal $S_r$. Similarly as in detection system 12 of FIG. 5, the detection system used in this method is divided into four parts, though these are four juxtaposed strips instead of four quadrants. The signal $S_c$ which is required for the formation of $S_r$ is then the sum of the detector signals of the four parts.

Figure 6:
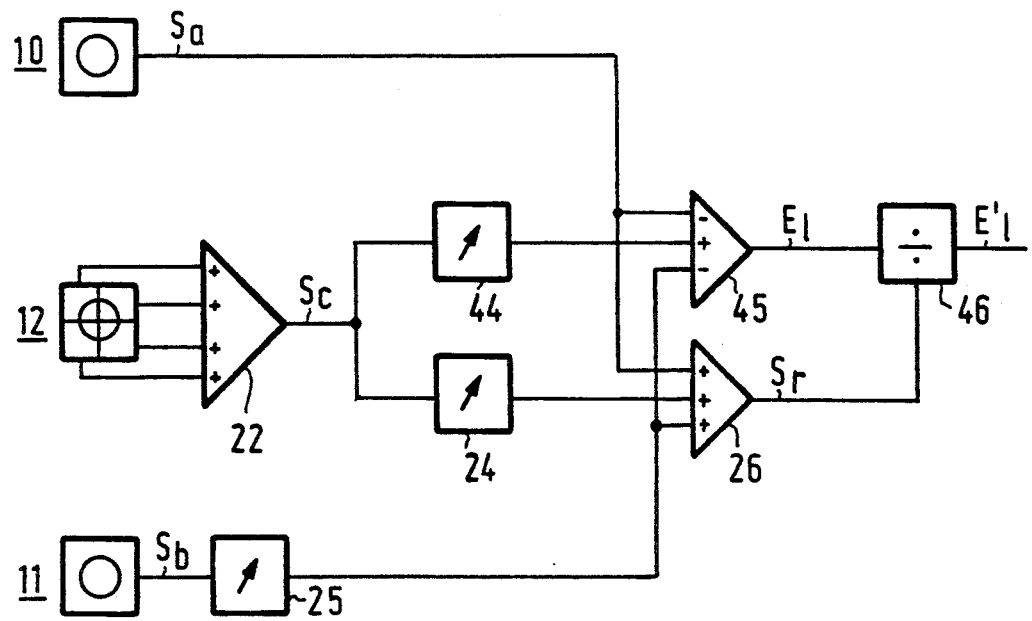
FIG. 6 shows a circuit for generating a normalized track loss signal.

Generating a track loss signal is known from UK Patent Specification no. 1,490,726. This signal is used, inter alia, for determining at which zero crossings of the tracking error signal $E_t$ the main spot 16 is present on a track and at which zero crossings it is exactly located between two tracks, and for determining whether the main spot 16 has lost the track. The track loss signal $E_1$ is generated in accordance with the formula $$E_1 = 2T S_c - (S_a + b S_b), \quad (16)$$

independent of $\phi$. FIG. 6 shows a circuit which performs the operation of formula (16). The summing amplifier 22 produces the signal $S_c$ which is divided by the constant factor 2T in a circuit 44. If the intensities of the spots 19 and 20 are not equal, the signal $S_b$ of detection system 11 can be multiplied by the constant factor b in the circuit 25. The amplifier 45 subsequently forms the signal $E_1$ by subtracting the signal $S_a$ and the signal of the circuit 25 from the signal of the circuit 44. The reference signal $S_r$ is formed in the same way as in, for example, FIG. 3. A normalizing circuit 46 divides the track loss signal $E_1$ by the reference signal $S_r$. The output signal $E_1'$ is the normalized track loss signal which can be used to determine whether there is track loss.

A further use of the reference signal is the normalization of a position signal which is a measure of, for example, the transversal position of the objective lens 9, or of the position of a tiltable mirror in the radiation path of the beam with which a fine setting of the transversal position of the main spot 16 with respect to a track to be scanned can be realised. This position may be important as it allows control of the mentioned position, which determines how the beam traverses the optical system. A proper control can take care that the beam traverses the optical system of the scanning head centrally, in that way minimizing optical aberrations in the beam. The position signal $E_p$ is obtained by the following combination of the push-pull signals:

$$E_p = 2T Pc + Pa + b Pb. \quad (17)$$

Figure 7:
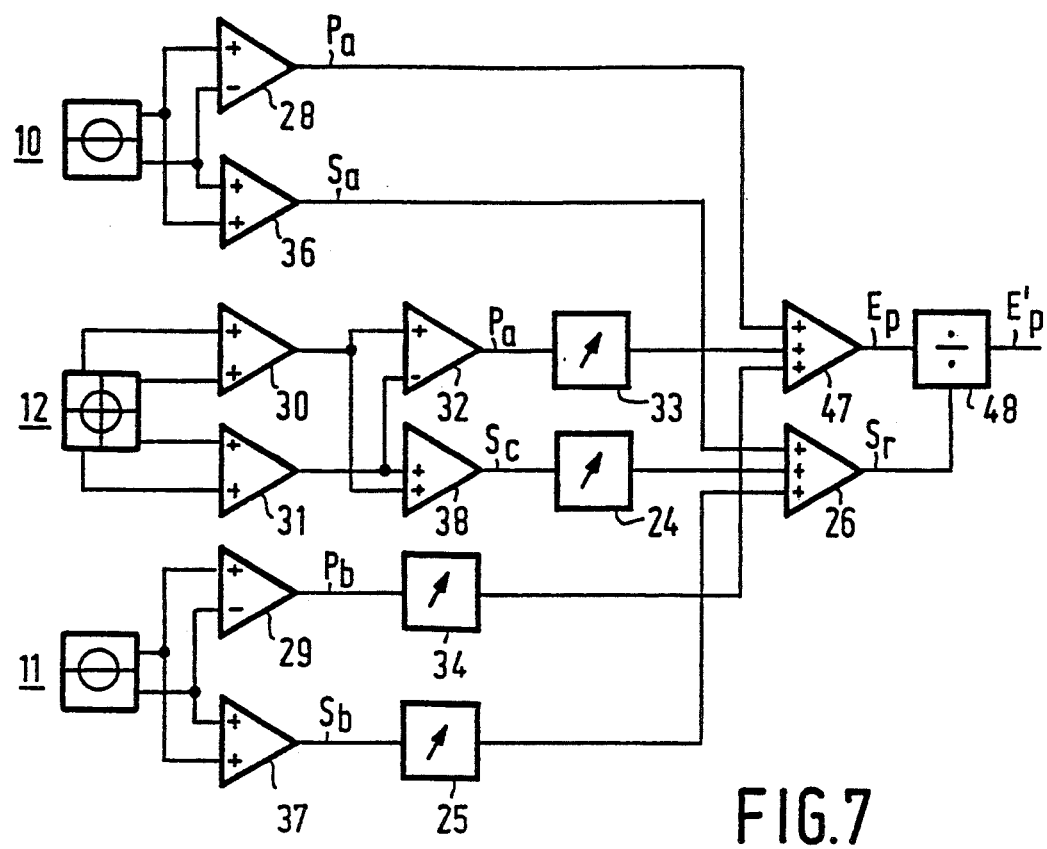
FIG. 7 shows a circuit for generating a normalized position signal.

If the tracking spots 14 and 15 are mutually at a transversal distance of a full track pitch, $E_p$ will be independent of x, hence free from modulation by the tracks. If the transversal position of the main spot 16 is controlled, for example, by a tiltable mirror, the signal $E_p$ provides information about the extent of tilt of the mirror. The addition in accordance with formula (16) can be realised in the embodiment of the signal processing circuit shown in FIG. 7. This circuit comprises a summing amplifier 47 which adds the output signals of the differential amplifier 28 and the circuits 33 and 34. A normalizing circuit 48 divides the position signal $E_p$ by the reference signal $S_r$. The output signal $E_p'$ is the normalized position signal which can be used for controlling the position of the objective lens or of the mirror.

The input signals of the normalizing circuits 27, 43, 46 and 48 may greatly vary in value. When the information plane 1 is written, the input signals are sometimes ten times larger than when reading the information plane, due to the required large laser power. The normalizing circuit must therefore have a large dynamic range, which makes the circuit expensive. A less expensive normalizing circuit with a smaller dynamic range can be used if the two input signals are each passed through an amplifier having an adjustable amplification, as is known from German Patent Application no. 37 43 884. By adjusting the amplification of the two amplifiers to be low during writing and to be high during reading, the inputs of the normalizing circuit receive signals whose values no longer vary to such a considerable extent.

The above-mentioned methods of generating and normalizing tracking error signals, focus error signals, track loss signals and position signals can be used independently of each other or in any desired combination. It is also possible to use the two tracking beams alone for generating a reference signal and to generate a tracking error signal by means of, for example, the main beam only.

The reference signal can also be used in a flaw discrimination circuit. A flaw can be a local change of the reflectance of the information plane, for instance due to an irregularity in a recording layer evaporated on the information plane. It can also be an irregularity in or on a substrate which carries the information plane and which is part of the optical path of the beams; these flaws appear to the device as changes in the reflectance of the information plane. In devices scanning the information plane in reflection, the most common flaws cause a reduction of the intensity of the reflected beams. Flaws can reduce the quality of the tracking error signal and the focus error signal during a short time to such an extent, that they are completely unreliable and will lead the tracking and focusing servo's astray, possibly resulting in trackloss. During a write session this could even cause overwriting information in neighbouring tracks. The recommended action of the scanning device is to put the servo's in a hold mode, in which each servo is controlled by an error signal with a level belonging to the situation just before the flaw. After the spots have passed the flaw, the error signals generated by the detection systems are input again into the servo's. It is clear that under certain circumstances a reliable detection of a flaw is necessary for proper operation of the device. To detect flaws in a device scanning the information plane in reflection, one could use the detector signal $S_c$ and check whether this signal drops below a predetermined level, henceforth called flaw level, because when a flaw occurs the intensity of the radiation reflected from the information plane reduces. A problem of such a flaw discriminator is, that the level of the signal $S_c$ is not only influenced by the presence of a flaw, but also by the position of the main spot with respect to the centreline of a track, as will be clear from formula (2). During a searching action $S_c$ will vary sinusoidally, which makes it difficult to detect flaws which could affect the focus servo during the search. More serious is the case when during tracking a mechanical disturbance causes the scanning head to go off-track. If the main spot moves away from the centreline of a broad track, the signal $S_c$ will drop. The flaw discriminator will interpret the drop as a flaw, and put the servo's in the hold-mode. Instead of performing a strong corrective action to avoid trackloss, the radial servo will be instructed to continue on the wrong course.

Figure 8:
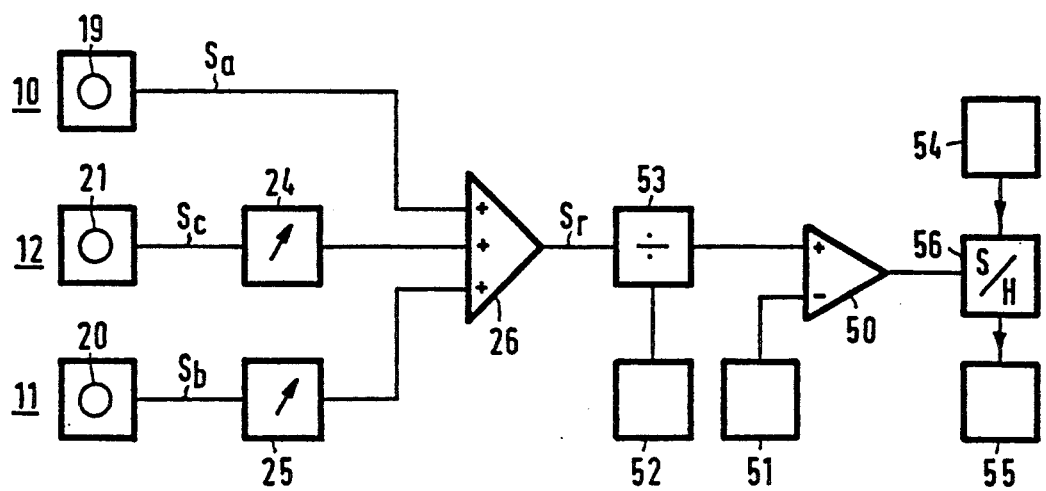
FIG. 8 shows an implementation of a flaw discriminator.

A solution to the above problem is to use the reference signal $S_r$ instead of $S_c$ as input for the flaw discriminator. Because $S_c$ is free from modulation by the tracks, it is a reliable signal to monitor the presence of flaws, especially during off-track conditions. FIG. 8 shows an embodiment of the flaw discriminator. By way of example the reference signal $S_r$ is generated in the same way as in the circuit of FIG. 3. A comparator 50 compares the signal $S_r$ with a signal set at the flaw level in a circuit 51. If the flaw discriminator is used in a scanning device which can both read and write information in the information plane, the comparison must be corrected for the changes in radiation level between reading and writing. Therefore, a circuit 52 generates a power signal, which represents the radiation level of the diode laser and is independent of the reflectance of the information plane. The circuit can be a monitor diode which intercepts part of the radiation emitted by the source and which has said power signal as output. It can also be the power control of the diode laser, which uses a setpoint to control the power level of the laser; the signal representing the setpoint is output as said power signal. The correction of the reference signal is made in a sub-circuit of the flaw discriminator. This sub-circuit can be a divider 53 as shown in FIG. 8, which normalizes the reference signal in conformity with the power signal. The sub-circuit can also be the circuit 51, which then adjusts the flaw level in conformity with the power signal. In that case the divider 53 is not necessary.

The output of the comparator 50 can for instance be used to put a tracking or focus servo in a hold mode. The error signal for the control of the servo is generated in a circuit 54. This circuit can be any of the circuits shown in FIGS. 3 to 7. The error signal is applied to a servo system 55 by means of a sample-and-hold (S/H) circuit 56. The S/H circuit is controlled by the output of the comparator 50. If the level of the reference signal is higher than the flaw level, the S/H circuit transfers the error signal to the servo system. If the level of the reference signal is below the flaw level, a flaw is detected, and the S/H circuit is put in the hold mode. This means that the output of the S/H circuit remains at the level of the error signal the circuit has sampled just before the emergence of the flaw. The servo system causes the spots on the information layer to continue their course blindly. As soon as the flaw has passed the spots, the comparator 50 sets the S/H circuit 56 again in the transfer mode, and the servo circuit 55 is controlled by the error signal in a normal way.

The described electronic circuits for generating the signals are only examples of many possible circuits performing the same functions. The fields of use of the described methods of normalization are not limited to said four examples, but cover all control signals which are generated from detector signals of the three detection systems. The foregoing will also have made it clear that the flaw discriminator can be used to protect any circuit in the scanning device from adverse effects of flaws. The invention is equally applicable in a device in which the information plane is scanned in transmission.

I claim:

1. A device for optically scanning tracks in an information plane of a record carrier, said device comprising an optical system for generating first and second tracking beams and a main beam, a lens system for focusing the three beams on the information plane to form two tracking spots at both sides of the centerline of a track to be scanned and one main spot on said track, at least three detection systems a, b and c for respectively receiving radiation from the information plane produced by the first and second tracking beams and the main beam and deriving therefrom respective detection signals $S_a$, $S_b$ and $S_c$, each detection signal being a measure of the total radiation energy incident on the relevant detection system; characterized in that said device comprises a signal processing circuit for deriving a reference signal $S_r$ from said detection signals in accordance with $$S_r = S_a + S_b + zS_c,$$

wherein z is a constant equal to $-2T\cos(\phi)$, $\phi = 2\pi x_0/q$, $x_0$ is the transverse distance between a tracking spot and the main spot, q is the track pitch, and T is the intensity ratio between a tracking beam and the main beam; whereby z is zero for $\phi = \pi/2$, and the reference signal $S_r$ is a measure of the total radiation energy incident on all of the detection systems and is free of modulation by deviations between the center of the main spot and the centerline of the track being scanned.

2. A device as claimed in claim 1, characterized in that $x_0 = \frac{1}{4}q$, so that the reference signal $S_r$ formed by said signal processing circuit is the sum of $S_a$ and $S_b$.

3. A device as claimed in claim 1, characterized in that $x_0 = \frac{1}{2}q$, so that the reference signal $S_r$ formed by said signal processing circuit is the sum of $S_a$, $S_b$ and $2TS_c$.

4. A device as claimed in claim 1, wherein the signal processing circuit comprises a circuit for multiplying one of the signals $S_a$, $S_b$ by a further constant, said further constant being dependent on the ratio of the tracking beam intensities.

5. A device as claimed in claim 1, further comprising a normalizing circuit for normalizing a control signal derived from the detection signals and used for positioning the main spot, the normalizing circuit having an input coupled to the output of the signal processing circuit to receive the reference signal $S_r$ produced thereby.

6. A device as claimed in claim 5 wherein the control signal is a tracking error signal, and further comprising a normalizing circuit for normalizing the tracking error signal in conformity with the reference signal.

7. A device as claimed in claim 5, wherein the control signal is a focus error signal, and further comprising a normalizing circuit for normalizing the focus error signal in conformity with the reference signal.

8. A device as claimed in claim 5, wherein the control signal is a track loss signal, and further comprising a normalizing circuit for normalizing the track loss signal in conformity with the reference signal.

9. A device as claimed in claim 5 wherein the control signal is a position signal which represents the position of an element with which the transverse position of the main spot with respect to the tracks can be adjusted, and further comprising a normalizing circuit for normalizing the position signal in conformity with the reference signal.

10. A device as claimed in claim 1, further comprising a flaw discriminator for detecting deviations in the reflectance of the information plane, an input of the flaw discriminator being connected to the output of the signal processing circuit to receive the reference signal $S_r$ produced thereby.

11. A device as claimed in claim 10, wherein the flaw discriminator comprises a sub-circuit having an input to receive the reference signal $S_r$ representing the radiation energy in all three beams in order to make the flaw discriminator independent of the radiation energy of said beams.

* * * * *